United States Patent
Balandin et al.

(10) Patent No.: US 9,571,448 B2
(45) Date of Patent: Feb. 14, 2017

(54) ADDRESS ASSIGNMENT PROTOCOL

(75) Inventors: Sergey Balandin, Helsinki (FI); Michel Gillet, Helsinki (FI)

(73) Assignee: Nokia Technologies Oy, Espoo (FI)

( * ) Notice: Subject to any disclaimer, the term of this patent is extended or adjusted under 35 U.S.C. 154(b) by 693 days.

(21) Appl. No.: 12/332,285

(22) Filed: Dec. 10, 2008

(65) Prior Publication Data

US 2009/0157854 A1 Jun. 18, 2009

Related U.S. Application Data

(60) Provisional application No. 61/013,255, filed on Dec. 12, 2007.

(51) Int. Cl.
*G06F 15/177* (2006.01)
*G06F 15/173* (2006.01)
*H04L 29/12* (2006.01)
*H04L 12/701* (2013.01)

(52) U.S. Cl.
CPC ..... *H04L 61/2038* (2013.01); *H04L 29/12254* (2013.01); *H04L 29/12283* (2013.01); *H04L 45/00* (2013.01); *H04L 61/2061* (2013.01)

(58) Field of Classification Search
CPC ...... H04L 61/20; H04L 61/2061; H04L 12/28; H04L 67/12; H04L 29/2038
USPC ......................... 709/201, 220, 222, 223, 226
See application file for complete search history.

(56) References Cited

U.S. PATENT DOCUMENTS

| | | | | |
|---|---|---|---|---|
| 4,959,856 A | * | 9/1990 | Bischoff | H04M 3/229 379/245 |
| 5,140,585 A | * | 8/1992 | Tomikawa | 370/354 |
| 5,646,939 A | * | 7/1997 | Lindeborg et al. | 370/258 |
| 5,689,726 A | * | 11/1997 | Lin | 710/10 |
| 5,727,146 A | * | 3/1998 | Savoldi et al. | 726/3 |
| 5,805,924 A | * | 9/1998 | Stoevhase | 710/11 |
| 5,901,325 A | * | 5/1999 | Cox | 710/1 |
| 5,926,104 A | * | 7/1999 | Robinson | 340/7.23 |
| 6,014,715 A | * | 1/2000 | Stoevhase | 710/11 |
| 6,266,336 B1 | * | 7/2001 | Siegel et al. | 370/405 |
| 6,393,483 B1 | * | 5/2002 | Latif | H04L 41/0668 370/230 |
| 6,430,182 B1 | * | 8/2002 | Oyama | 370/388 |
| 6,456,597 B1 | * | 9/2002 | Bare | H04L 29/12009 370/252 |
| 6,606,679 B2 | * | 8/2003 | Solomon et al. | 710/314 |
| 6,611,894 B1 | * | 8/2003 | Onoo | 711/5 |
| 6,665,733 B1 | * | 12/2003 | Witkowski | H04L 12/467 370/235 |
| 7,024,501 B1 | * | 4/2006 | Wright | A63F 13/02 710/14 |
| 7,099,955 B1 | * | 8/2006 | Gregg et al. | 709/238 |

(Continued)

*Primary Examiner* — Madhu Woolcock
(74) *Attorney, Agent, or Firm* — Banner & Witcoff, Ltd.

(57) ABSTRACT

Exemplary embodiments of the present invention provide a method comprising receiving, at a node, an address assignment message, allocating, by the node, a predetermined address interval of an available address space to a respective port of the node which predetermined address interval is defined in the address assignment message, and assigning at least one address for performing communication via a respective port starting with a center address of the predetermined address interval of the available address space allocated for the port concerned. Further, exemplary embodiments of the present invention also relate to respective devices and system.

22 Claims, 6 Drawing Sheets

(56) References Cited

U.S. PATENT DOCUMENTS

| | | | |
|---|---|---|---|
| 7,227,872 B1* | 6/2007 | Biswas et al. | 370/465 |
| 7,412,515 B2* | 8/2008 | Kupst et al. | 709/226 |
| 7,433,673 B1* | 10/2008 | Everson et al. | 455/404.1 |
| 7,450,560 B1* | 11/2008 | Grabelsky et al. | 370/352 |
| 7,454,587 B1* | 11/2008 | Kulkarni | G06F 12/023 711/153 |
| 7,461,194 B2* | 12/2008 | Ohara et al. | 710/305 |
| 7,478,178 B2* | 1/2009 | Torudbakken et al. | 710/31 |
| 7,647,438 B1* | 1/2010 | Norrie et al. | 710/54 |
| 7,694,025 B1* | 4/2010 | Norrie | 710/3 |
| 7,710,862 B2* | 5/2010 | McGee et al. | 370/216 |
| 7,822,002 B2* | 10/2010 | Narayanan et al. | 370/338 |
| 8,345,052 B1* | 1/2013 | Diard | 345/502 |
| 2002/0010735 A1* | 1/2002 | McMillen et al. | 709/201 |
| 2002/0165972 A1* | 11/2002 | Chien et al. | 709/229 |
| 2003/0028751 A1* | 2/2003 | McDonald et al. | 712/34 |
| 2003/0112794 A1* | 6/2003 | Manohar | 370/352 |
| 2003/0115303 A1* | 6/2003 | Marian et al. | 709/222 |
| 2003/0225990 A1* | 12/2003 | Brown et al. | 711/170 |
| 2003/0229721 A1* | 12/2003 | Bonola et al. | 709/253 |
| 2004/0019732 A1* | 1/2004 | Overtoom et al. | 710/313 |
| 2004/0024964 A1* | 2/2004 | Taninaka et al. | 711/114 |
| 2004/0068589 A1* | 4/2004 | Witkowski et al. | 709/249 |
| 2004/0073636 A1* | 4/2004 | Chase-Salerno et al. | 709/222 |
| 2004/0165534 A1* | 8/2004 | Claseman | H04L 1/1607 370/241.1 |
| 2005/0027920 A1* | 2/2005 | Fitzsimmons et al. | 710/317 |
| 2005/0147114 A1* | 7/2005 | Stewart et al. | 370/432 |
| 2005/0160174 A1* | 7/2005 | Ingmar et al. | 709/228 |
| 2006/0136621 A1* | 6/2006 | Tung et al. | 710/62 |
| 2006/0174048 A1* | 8/2006 | Ohara et al. | 710/305 |
| 2006/0179145 A1* | 8/2006 | Khawand | 709/227 |
| 2007/0147267 A1* | 6/2007 | Holland | 370/252 |
| 2008/0162725 A1* | 7/2008 | Kambhatla | H04L 29/12254 709/245 |
| 2009/0031012 A1* | 1/2009 | Johnson | 709/222 |

* cited by examiner

ADDRESS ASSIGNMENT PROTOCOL

FIELD OF THE INVENTION

Embodiments of the present invention relate to a method and a related device for address assignment in a communication network.

In a system area network, a communication centric network protocol is defined which uses network addresses as destination and/or source of every packet in the network. All operations, functions and protocols cannot operate before the association of a unique network address for every single device in the network, a sub-network or a cluster is made. Therefore, it is necessary that upon the boot up of a system area network, every node in the network gets a unique network address.

The discovery and network assignment protocols that are used, e.g. in IP (Internet Protocol) networks, are not suitable for system area networks as they have been designed with completely different architecture and limitations in mind.

In the IP case, some protocols like RARP (Reverse Address Resolution Protocol), BOOTP (Boot Protocol) and DHCP (Dynamic Host Configuration Protocol) have been developed, but they are all designed to fit with the internet architecture and are not suitable for system area networks.

Currently, in system area networks, an address assignment protocol is defined which supports serialized address assignment. However, such a protocol does not provide an address assignment for devices according to an older version of the protocol located behind gateways.

SUMMARY

In accordance with an exemplary embodiment of the present invention there is provided a method for assigning addresses in a system area network where assignments are optimized for range-based routing.

In accordance with an exemplary embodiment of the present invention, there is provided a method, comprising:

receiving, at a node, an address assignment message;

allocating, by the node, a predetermined address interval of an available address space to a respective port of the node which predetermined address interval is defined in the address assignment message, assigning at least one address for performing communication via a respective port starting with a center address of the predetermined address interval of the available address space allocated for the port concerned.

The method may further comprise forwarding, by the node, the address assignment message via each of its ports which are distinct from the port at which the address assignment message has been received.

The method may further comprise evaluating, at the node, whether the predetermined address interval of the available address space allocated for a respective port is sufficient for assigning at least one individual address to each respective other node connected to this port of the node, and if the node evaluates that the allocated predetermined address interval of the available address space allocated for a respective port is not sufficient, requesting assignment of at least one additional address from at least one predetermined address interval allocated to at least one other port of the node.

If the node evaluates that the allocated predetermined address interval of the available address space allocated for a respective port is not sufficient, the assignment of at least one additional address is preferentially requested from at least one predetermined address interval allocated to at least one other port adjacent to the respective port of the node.

The method may further comprise determining, at the node, whether at least one non-assigned address is available in the at least one predetermined address interval allocated to the at least one other port of the node, and if it is determined that at least one non-assigned address is available in the at least one predetermined address interval allocated to the other port of the node, assigning that at least one non-assigned address as the at least one additional address for performing communication via the respective port for which it was evaluated that the predetermined address interval allocated thereto is not sufficient.

The method may further comprise, if it is determined that at least one non-assigned address is not available in the at least one predetermined address interval allocated to the other port of the node, requesting assignment of at least one additional address from at least one predetermined address interval allocated to at least one respective port of another node having a higher level in hierarchy than itself.

The method may further comprise determining, at the other node, whether at least one non-assigned address is available in the at least one predetermined address interval allocated to at least one respective port of the other node having a higher level in hierarchy, and if it is determined that at least one non-assigned address is available in the at least one predetermined address interval allocated to at least one respective port of the other node having a higher level in hierarchy, assigning that at least one non-assigned address as the at least one additional address for performing communication via the respective port of the node for which it was evaluated that the predetermined address interval allocated thereto is not sufficient.

The determining whether at least one non-assigned address is available in the at least one predetermined address interval allocated to at least one respective port of the other node having a higher level in hierarchy may be based on a report of address space usage provided from nodes other than the node requesting assignment of an additional address having a lower level in hierarchy than the other node.

All processing steps that have been described in the foregoing can also be implemented using computer-readable signals that may be stored on a computer-readable medium and carry instructions to be executed by the node.

In accordance with another exemplary embodiment of the present invention, there is provided a node, comprising:

a transceiver configured to receive an address assignment message;

an allocating unit configured to allocate a predetermined address interval of an available address space to a respective port which predetermined address interval is defined in the address assignment message;

an assigning unit configured to assign at least one address for performing communication via a respective port, starting with a center address of the predetermined address interval of the available address space allocated for the port concerned.

The node may further comprise a forwarding unit configured to forward the address assignment message via each of its ports which are distinct from the port at which the address assignment message has been received.

The node may further comprise
- a evaluating unit configured to evaluate whether the predetermined address interval of the available address space allocated for a respective port is sufficient for assigning at least one individual address to each respective other node connected to this port of the node, and
- a requesting unit configured to request, if the evaluating unit evaluates that the allocated predetermined address interval of the available address space allocated for a respective port is not sufficient, assignment of at least one additional address from at least one predetermined address interval allocated to at least one other port of the node.

The requesting unit is further configured to request, if the evaluating unit evaluates that the allocated predetermined address interval of the available address space allocated for a respective port is not sufficient, assignment of at least one additional address from at least one predetermined address interval allocated to at least one other port adjacent to the respective port of the node.

The node may further comprise
- a determining unit configured to determine whether at least one non-assigned address is available in the at least one predetermined address interval allocated to the at least one other port of the node, and
- if it is determined that at least one non-assigned address is available in the at least one predetermined address interval allocated to the at least one other port of the node, the assigning unit is further configured to assign the at least one non-assigned address as the at least one additional address for performing communication via the respective port for which it was evaluated that the predetermined address interval allocated thereto is not sufficient.

If it is determined that at least one non-assigned address is not available in the at least one predetermined address interval allocated to the at least one other port of the node, the requesting unit may further be configured to request assignment of at least one additional address from at least one predetermined address interval allocated to at least one respective port of another node having a higher level in hierarchy than itself.

The transceiver may further be configured to receive a request for an assignment of at least one additional address from at least one predetermined address interval allocated to at least one respective port from a node having a lower level in hierarchy for which it was evaluated that the predetermined address interval allocated thereto is not sufficient.

The determining unit may further be configured to determine whether at least one non-assigned address is available in the at least one predetermined address interval allocated to at least one respective port, and if it is determined that at least one non-assigned address is available in the at least one predetermined address interval allocated to the at least one respective port,
- the assigning unit may further be configured to assign the at least one non-assigned address as the at least one additional address for performing communication via the respective port of the node having a lower level in hierarchy for which it was evaluated that the predetermined address interval allocated thereto is not sufficient.

The transceiver may further be configured to send and to receiver reports of address space usage and the determining whether at least one non-assigned address is available in at least one predetermined address interval allocated to the at least one respective port may be based on a report of address space usage provided from nodes other than the node requesting assignment of at least one additional address having a lower level in hierarchy.

In accordance with another exemplary embodiment of the present invention, there is provided a system, comprising:
- a first node, at least one second node and at least one third node:
- the first node comprising:
- a sending unit configured to send an address assignment message to the at least one second node attached to the first node;
- the at least one second node comprising:
- a transceiver configured to receive an address assignment message;
- an allocating unit configured to allocate a predetermined address interval of an available address space to a respective port which predetermined address interval is defined in the address assignment message;
- an assigning unit configured to assign at least one address for performing communication via a respective port with the at least one third node attached to the respective port, starting with a center address of the predetermined address interval of the available address space allocated for the port concerned.

In the above mentioned system, the first node may be a host, the at least one second node may be a switch and the at least one third node may be a client.

In accordance with another exemplary embodiment of the present invention, there is provided a node, comprising:
- a transceiver means for receiving an address assignment message;
- an allocating means for allocating a predetermined address interval of an available address space to a respective port which predetermined address interval is defined in the address assignment message;
- an assigning means for assigning at least one address for performing communication via a respective port, starting with a center address of the predetermined address interval of the available address space allocated for the port concerned.

In accordance with another exemplary embodiment of the present invention, there is provided a system, comprising:
- a first node, at least one second node and at least one third node:
- the first node comprising:
- a sending means for sending an address assignment message to the at least one second node attached to the first node;
- the at least one second node comprising:
- a transceiver means for receiving an address assignment message;
- an allocating means for allocating a predetermined address interval of an available address space to a respective port which predetermined address interval is defined in the address assignment message;
- an assigning means for assigning at least one address for performing communication via a respective port with the at least one third node attached to the respective port, starting with a center address of the predetermined address interval of the available address space allocated for the port concerned.

According to an example of the proposed method, at each port a part of the available address space is allocated per port as default. Further, the method provides for changing the pre-allocations if it is detected later on that there is a need for a bigger address interval in a segment, e.g. if the connected network segment includes many nodes and the available address interval is not sufficient.

The proposed address assignment procedure is optimized for range-based routing. Further, it allows to have unused addresses in the device address space, which is useful for range-based routing compression.

Exemplary embodiments of the present invention solve the problem of assigning addresses to devices which are connected via gateways. The result address assignment is optimized for range-based routing, which allows keeping routing tables short and route lookup time small. In addition the exemplary embodiments of the invention solve the problem of address assignment if a node is attached after the initial enumeration procedure during boot up of the network is executed. A node can be added at any time and a non-assigned network address can be found in most cases. That means that devices are supported that are hot plugged or have a long boot up procedure.

BRIEF DESCRIPTION OF THE DRAWINGS

At least some exemplary embodiments of the present invention are described herein below by way of example with reference to the accompanying drawings, wherein.

DESCRIPTION OF EXEMPLARY EMBODIMENTS

Reference will now be made to exemplary embodiments of the invention. Examples of exemplary embodiments are illustrated in the accompanying drawings.

For the purpose of the exemplary embodiments of the present invention to be described herein below, it should be noted that a client is an addressable node in the network; it may for example be any kind of functional module like a display, camera, graphic processor or modem, such as wireless or wired modules, irrespective of a specific standard to which these conform.

Additionally, for the purpose of the exemplary embodiments of the present invention to be described herein below, it should be noted that method steps likely to be implemented as (low level) software code portions and being run using a processor at the client, switch or host, are software code independent and can be specified using any known or future developed programming language as long as the functionality defined by the method steps is preserved.

Generally, any method step is suitable to be implemented as software, or by hardware, without changing the idea of the exemplary embodiments of the present invention in terms of the functionality implemented. Furthermore, any method steps and/or devices likely to be implemented as hardware components at one of the network elements are hardware independent and can be implemented using any known or future developed hardware technology or any hybrids of these, such as MOS (Metal Oxide Semiconductor), CMOS (Complementary MOS), BiCMOS (Bipolar CMOS), ECL (Emitter Coupled Logic), TTL (Transistor Transistor Logic), etc., using for example ASIC (Application Specific Integrated Circuit) components or DSP (Digital Signal Processor) components, as an example.

Additionally, for the purpose of the exemplary embodiments of the present invention to be described herein below, it should be noted that devices can be implemented as individual devices, but this does not exclude that they are implemented in a distributed fashion throughout the system, as long as the functionality of the device/system is preserved. Additionally, any respective elements, e.g. transceiver, allocating unit etc. according to embodiments can be implemented by any known means, either in hardware (e.g. using DSP, microprocessor, microcontroller, ASIC, field programmable gate array (FPGA), AD- and DA-converters, power amplifiers, filters, antennas, etc.) and/or software, respectively, as long as it is adapted to perform the described functions of the respective parts.

In the figures, individual steps can be merged to be executed simultaneously, or partitioned to sub-steps to be executed sequentially, without essentially modifying the substance of the exemplary embodiments of the invention.

Figure 1:
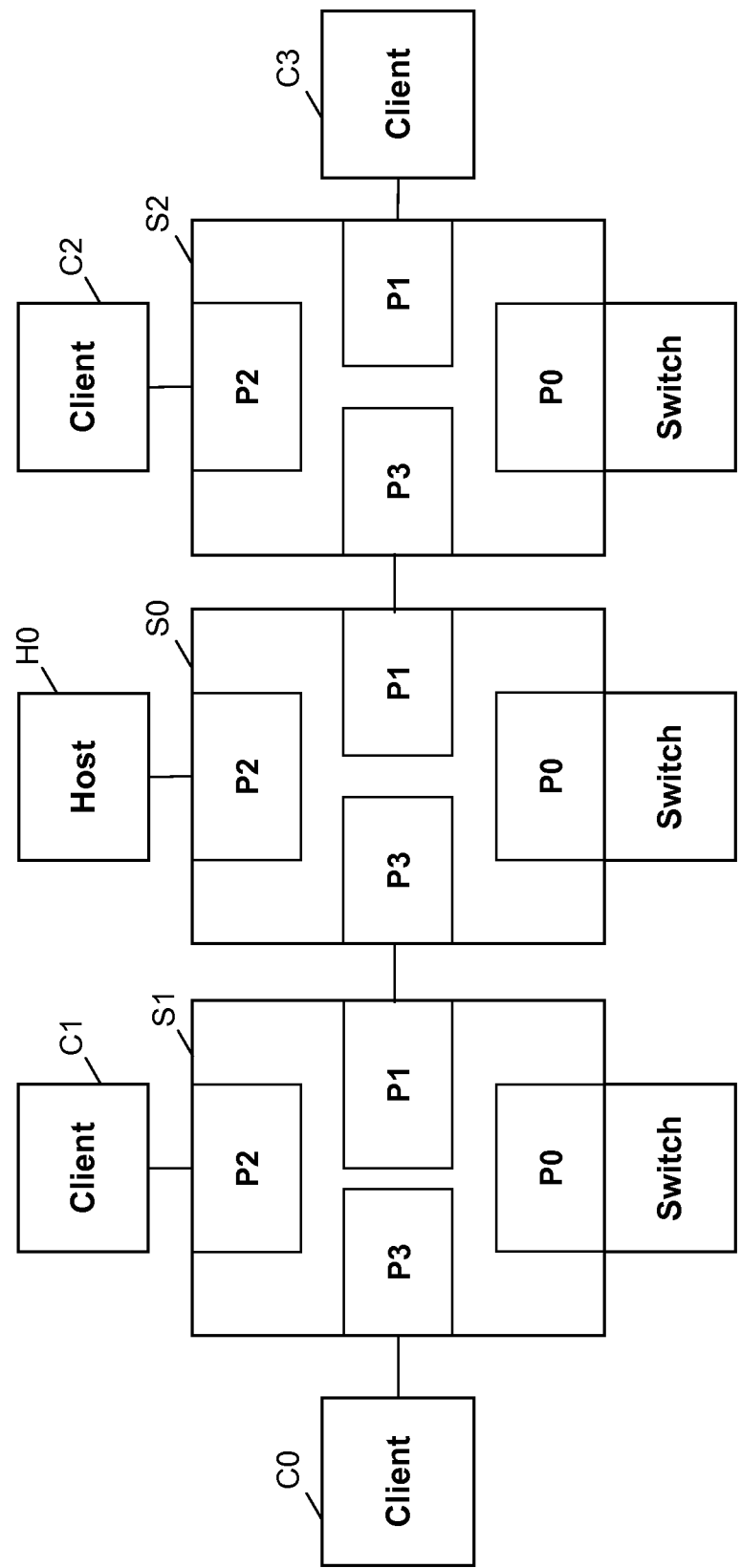
FIG. 1 is an overview of a network to which exemplary embodiments of the invention are applicable.

FIG. 1 is an overview of a network to which exemplary embodiments of the present invention are applicable. This exemplary network could be an embedded network that has a host H0, three switches S0, S1 and S2, and four clients C0 to C3. The number of the switches, clients and hosts is however not restricted to the number of the above exemplary network scenario. For example, in FIG. 1 it is indicated that an additional switch can be connected to switch S1 via port P0.

In case the network comprises more than one host, it might be necessary to perform some kind of arbitration scheme between the hosts. In another scenario, the hosts might have different areas of responsibilities in the network. That means, there might be two sub-networks around these nodes and each node gets a part of the available address space and perform parallel address assignment.

In FIG. 1, host H0 is the node having the highest level in hierarchy and switch S0 which is connected directly to the host H0 has a level in hierarchy one step lower than the host H0. Then, switches S1 and S2 which are connected to switch S0 have a level in hierarchy which is another step lower than that of switch S0, and so on.

Further, in the exemplary network shown in FIG. 1, host H0 is located substantially in the middle of the network. That causes that the same number of nodes is connected to switch S0, which is directly connected to host H0. Such an arrangement is particularly advantageous for the exemplary embodiments of the invention. However, examples of networks, to which exemplary embodiments of the invention are applicable, are not limited to such an arrangement.

According to exemplary embodiments of the invention there is proposed an alternative address assignment (enumeration) procedure for system area networks. First, the enumeration procedure is initiated by the host and executed as a part of the network start-up sequence. In the address assignment procedure, first a parallel assignment of address intervals is performed at all switches. Then, if needed, the address deficit in some network sub-trees is compensated using address space gaps of another sub-trees.

A detailed description of the address assignment procedure according to exemplary embodiments of the invention will be given below with reference to FIG. 2.

Figure 2:
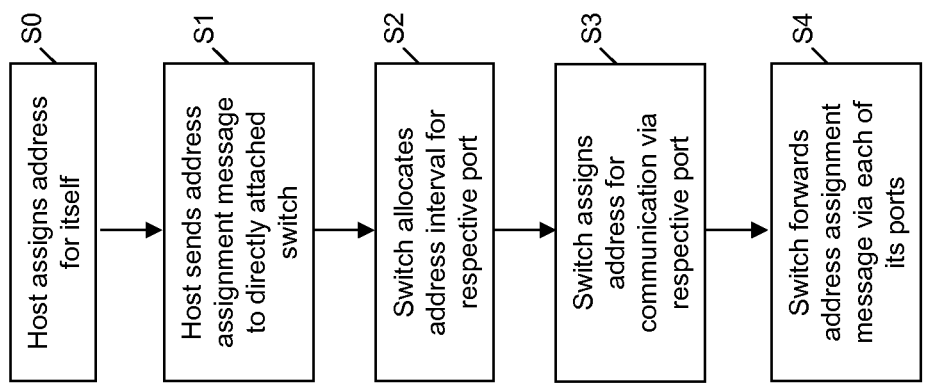
FIG. 2 is a flowchart illustrating an address assignment procedure according to an exemplary embodiment of the invention.

FIG. 2 is a flowchart illustrating an address assignment procedure according to an exemplary embodiment of the invention.

First, in step S0, the host initiates the address assignment procedure by assigning an address for itself, e.g. address 0. Then, in step S1, the host sends an address assignment message to a node directly connected thereto which according to the example shown in FIG. 1 is a switch. In a step S2, the switch allocates a predetermined address interval of an available address space to a respective port of the switch which is not associated with a gateway. The size of the address interval is predetermined according to the address assignment sent by the host.

Figure 3:
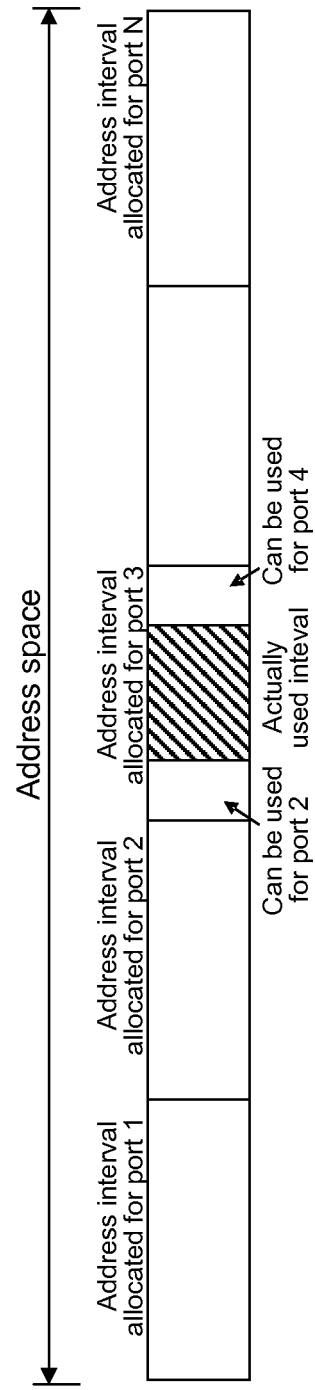
FIG. 3 is a diagram illustrating address intervals allocated to ports of a switch according an exemplary embodiment of the invention.

FIG. 3 shows an example of an available address space and how this address space is allocated to the ports of the node. According to FIG. 3, each address interval allocated to a respective one of the ports of the node has the same size. However, it is to be noted that the size of the address interval allocated to respective ports of the node can have different sizes, i.e. contain a different number of addresses.

If a port is associated with a gateway, accurate address space allocation and assignment can be made, as the gateway itself is seen as a kind of host for the network or nodes that are attached to the other side of the gateway. In the case of a gateway, only one address is reserved since the tunneling protocol used by the gateway will take care of handling devices connected thereto even if the connected network segment includes many nodes and the available address interval is not sufficient.

Referring back to FIG. 2, in step S3, the switch assigns an address to the respective port for enabling communication via the respective port. If more than one node is connected to the respective port, an individual address is assigned uniquely to each node connected to the respective port.

The switch starts assigning addresses starting with a center address of the predetermined address interval of the available address space allocated for the respective port. The center address is an address which has an equal distance from the lowest available address to the highest available address. For example, in case the predetermined address interval contains an uneven number of addresses, e.g. 7 addresses in total ranging from 3 to 9, the center address is address 6. However, in case the predetermined address interval contains an even number of addresses, e.g. 8 addresses ranging from 3 to 10, there would be no center address having an integer. Here, there are two addresses located in the center of the address interval, namely, address 6 and address 7. In such a case, one of these addresses is used as the center address.

Then, the switch replies with an address assignment confirmation message which allows releasing unused space at a node with a higher level in hierarchy. Further, in step S4, the switch forwards the address assignment message via each of its ports which are distinct from the port at which the address assignment message has been received.

If the next receiving end is a switch, then the procedure goes back to step S2 and the subsequent process is repeated for that switch.

Figure 4:
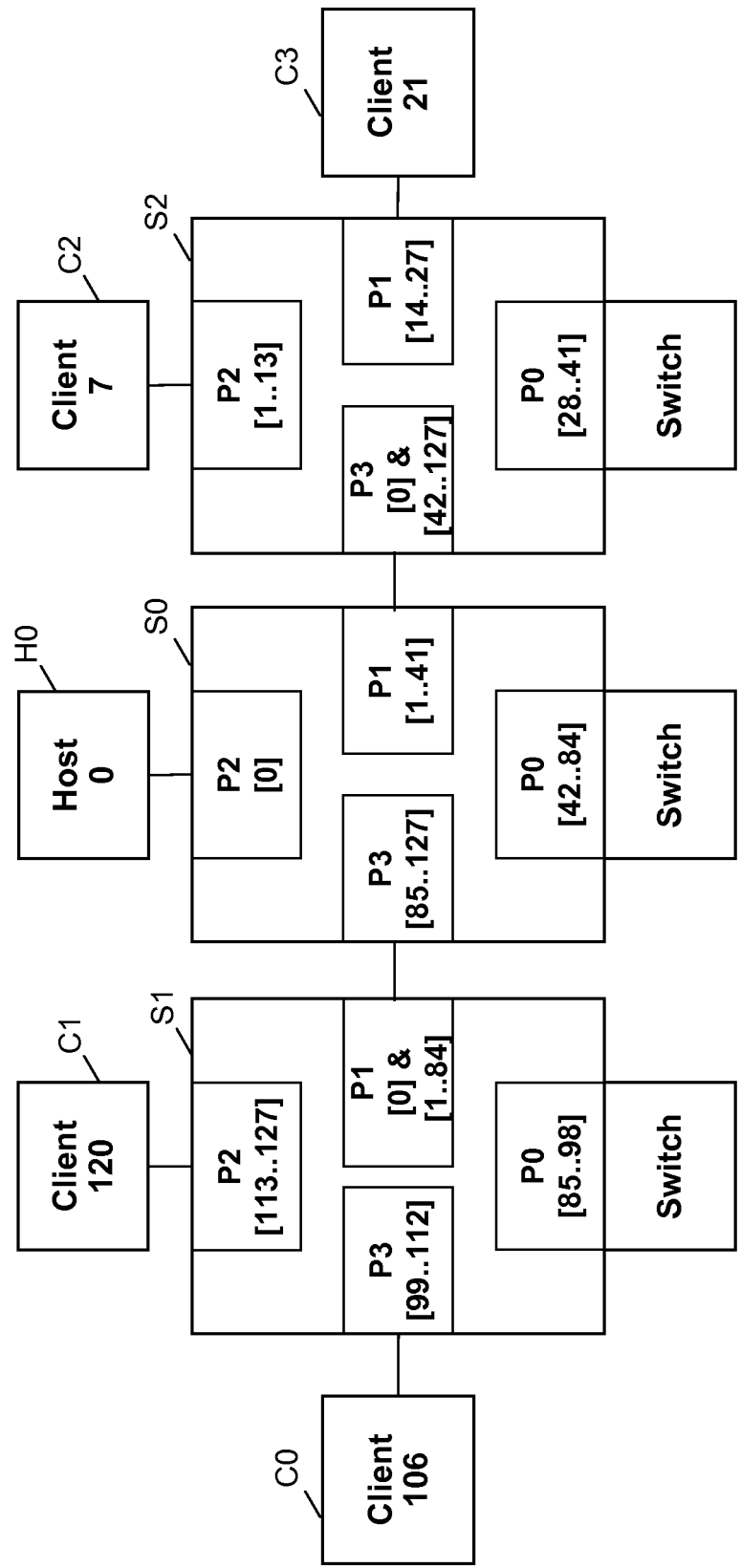
FIG. 4 is an overview of a network after performing the address assignment procedure according to an exemplary embodiment of the invention.

FIG. 4 shows an overview of a network after performing the address assignment procedure according to an exemplary embodiment of the invention.

As can be seen from FIG. 4, based on an address interval allocation from host H0, the following address intervals are allocated to the ports of switch S0. To port P0 an interval [42 . . . 84] is allocated, to port P1 an interval [1 . . . 41] is allocated, to port P2 an interval [0] is allocated and port to P3 an interval [85 . . . 127] is allocated. To port P2 of switch S0, only the host H0 is connected. To port P1 of switch S0, a switch S2 is connected, and the intervals of the ports of switch S2 are allocated according to the address interval available at port P1 of switch S0. Namely, the address intervals of ports P0 to P2 of switch S2 are [1 . . . 41]. For example, the address interval of port P1 of switch S2 is [14 to 27], and therefore, address 21, which is the center address of the address interval [14 . . . 27] is assigned to a client C3 connected to port P1 of switch S2.

Port P1 of switch S1 and port P3 of switch S2 also have an address [0], which indicates that the host H0 can be reached via that port, here via switch S0 for switch S1 as well as for switch S2.

At a certain point there might occur a case in which a node like e.g. a switch finds out that the allocated address interval is not sufficient, e.g. if many nodes are connected to a port and there are not enough addresses in the allocated address interval to assign at least one individual address to each respective node connected to this port.

Figure 5:
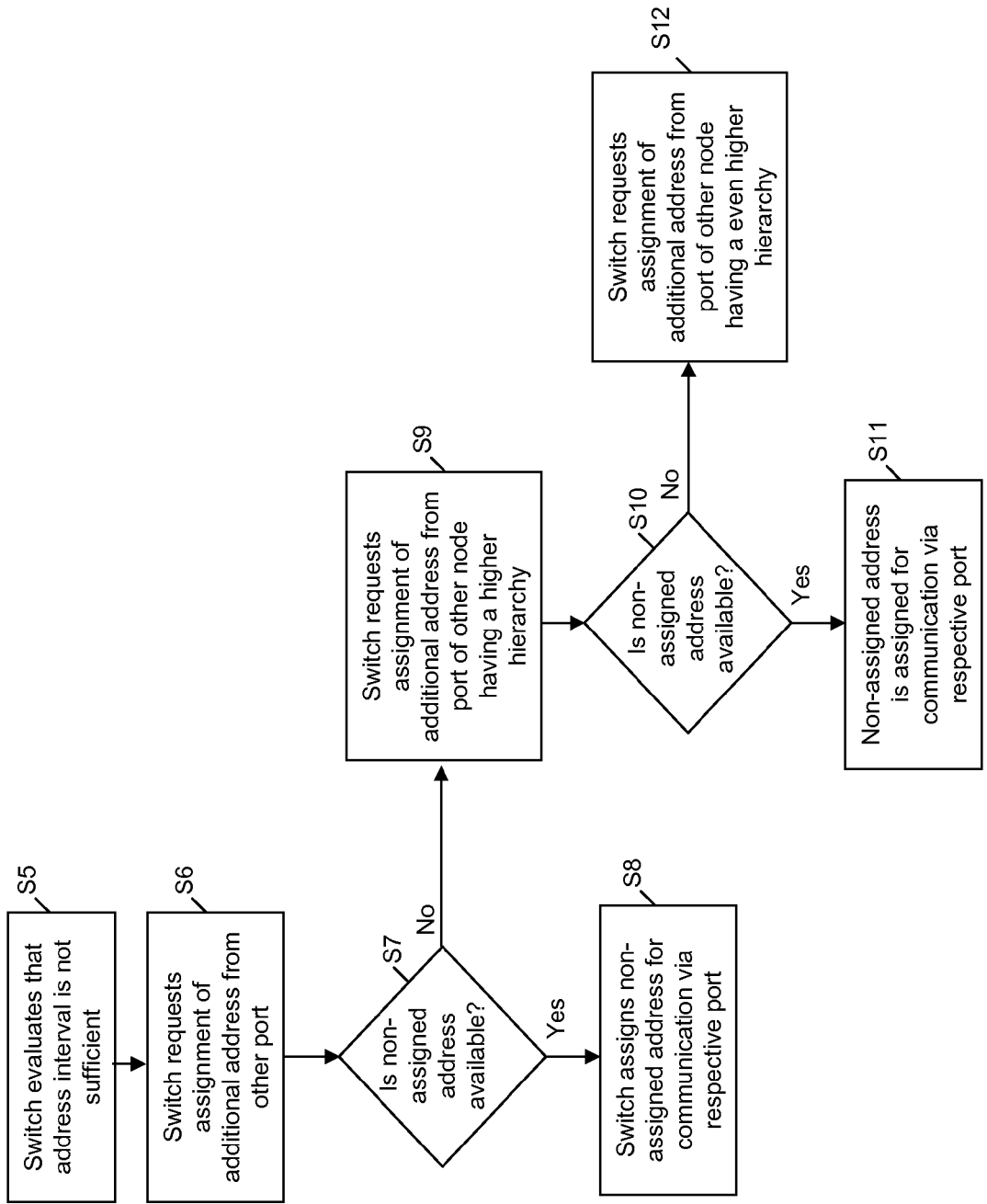
FIG. 5 is a flowchart illustrating a procedure for requesting additional addresses according to an exemplary embodiment of the invention.

In such a case, a procedure as illustrated in FIG. 5 is performed. FIG. 5 is a flowchart illustrating a procedure for requesting additional addresses according to an exemplary embodiment of the invention.

In step S5, the switch evaluates that the address interval allocated to a respective port is not sufficient, i.e. that there are not enough addresses in the allocated address interval to assign at least one individual address to each respective node connected to this port of the switch. Therefore, in step S6, the switch requests an assignment of at least one additional address from at least one predetermined address interval allocated to another port of the switch. Then, in step S7, the switch determines whether at least one non-assigned address is available in the predetermined address interval allocated to another port of the node. If the switch determines that at least one non-assigned address is available, in step S8, that at least one non-assigned address is assigned as the at least on additional address for performing communication via the respective port for which is was evaluated that the predetermined address interval allocated thereto is not sufficient.

However, if it is determined in step S7 that at least one non-assigned address is not available in the predetermined address interval allocated to another port of the switch, in step S9, the switch sends a special message to another node having a higher level in hierarchy requesting an assignment of at least one additional address from at least one predetermined address interval allocated to a respective port of the other node having a higher level in hierarchy.

In step S10, the other node determines whether at least one non-assigned address is available in the predetermined address interval allocated to a respective one of its ports. If the other node determines that at least one non-assigned address is available, in step S11, the at least one non-assigned address is assigned as the at least one additional address for performing communication via the port for which it was evaluated that that the predetermined address interval allocated thereto is not sufficient.

Further, if it is determined in step S10 that at least one non-assigned address is not available in the predetermined address interval allocated to a respective port of the other node, in step S12, the switch sends the special message to another node having a level in hierarchy one step higher requesting an assignment of at least one additional address from at least one predetermined address interval allocated to a respective port of the other node having a level in hierarchy one step higher. Then, the steps as already described above will be executed in a similar manner.

The determining whether at least one non-assigned address is available in the predetermined address interval allocated to a respective port of the other node having a higher level in hierarchy may be based on a report of address space usage provided from nodes other than the node requesting assignment of an additional address having a lower level in hierarchy than the other node.

Referring to FIG. 4, an example of the procedure as shown in FIG. 5 would be as follows.

If it is determined in step S5 that the address interval allocated to e.g. port P1 of switch S2 is not sufficient, in step S6, the switch S2 requests an assignment of at least one additional address from at least one predetermined address interval allocated to port P2 or P0 of the switch S2. If the switch determines that at least one non-assigned address is available at e.g. port P2, in step S8, the at least one non-assigned address of port P2 is assigned as the at least one additional address for performing communication via the port P1 for which it has been evaluated that the predetermined address interval allocated thereto is not sufficient.

However, if it is determined in step S7 that at least one non-assigned address is not available in the predetermined address interval allocated to port P2 or port P0 of switch S2, in step S9, the switch S2 sends a special message to switch S0 having a higher level in hierarchy requesting an assignment of at least one additional address from at least one predetermined address interval allocated to a respective port of switch S0.

In step S10, switch S0 determines whether at least one non-assigned address is available in the predetermined address interval allocated to a respective one of its ports. If the switch S0 determines that at least one non-assigned address is available, in step S11, the at least one non-assigned address is assigned as the at least one additional address for performing communication via the port P1 of switch S2 for it was evaluated that the predetermined address interval allocated thereto is not sufficient.

The request for an assignment of at least one additional address can involve several hierarchy levels if the higher hierarchy can not serve the request.

It is to be noted that even if the procedure goes one step higher in the hierarchy, the switch will not need to implement a complex behavior. All the intelligence can still be centralized in the host.

It is to be noted that if in a later stage after the initial enumeration is finalized a new device is discovered at one port of a switch or in a sub-network, then a similar address assignment procedure is used including the procedure to request an address from one hierarchy level higher.

Figure 6:
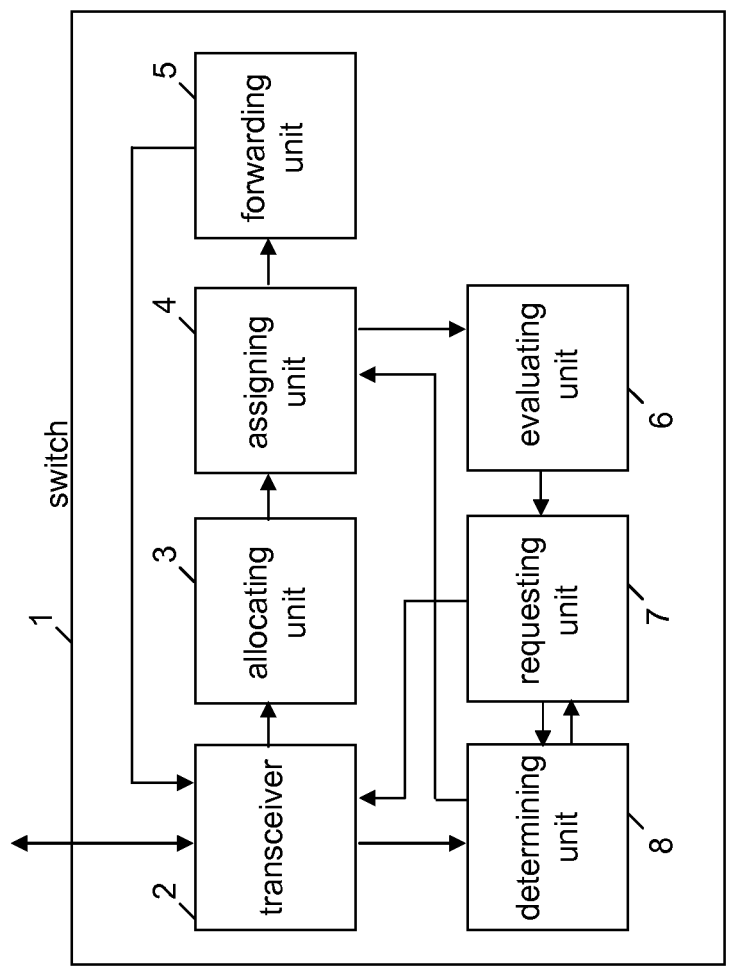
FIG. 6 is a block diagram illustrating an example of a node according to an exemplary embodiment of the invention.

FIG. 6 is a block diagram illustrating an example of a node according to exemplary embodiments of the invention.

As can be seen in FIG. 6, a node in the network according to exemplary embodiments of the invention like e.g. a switch 1 comprises a transceiver 2 for receiving an address assignment message from e.g. a host. The transceiver 2 is connected to an allocating unit 3 and sends the address assignment message to the allocating unit 3. The allocating unit 3 allocates a predetermined address interval of an available address space to a respective port. The predetermined address interval is defined in the address assignment message. The allocating unit 3 is connected to an assignment unit 4 and informs the assignment unit 4 about the allocated address interval of a respective port. The assignment unit 4 then assigns an address for performing communication via a respective port starting with a center address of the predetermined address interval of the available address interval allocated for the respective port.

Then, the address assignment message is forwarded via each port of the switch which is distinct from the port at which the address assignment message has been received, by a forwarding unit 5.

The switch further comprises an evaluating unit 6 which evaluates, based on information provided from the assigning unit 4, whether the predetermined address interval of the available address space which has been allocated for a respective port, is sufficient for that port, as described above. If the evaluating unit 6 evaluates that the allocated address interval is not sufficient, it informs a requesting unit 7 connected thereto accordingly.

The requesting unit 7 then requests an assignment of at least one additional address from at least one predetermined address interval allocated to another port of the switch 1. A determining unit 8 receives the request from the requesting unit 7 and determines whether at least one non-assigned address is available in the predetermined address interval allocated to another port of the switch 1. If at least one non-assigned address is available, the assigning unit 4 assigns the at least one non-assigned address as the at least one additional address for performing communication via the respective port for which it was evaluated that the predetermined address interval allocated thereto is not sufficient.

If the determining unit 8 determines that at least one non-assigned address is not available, the requesting unit 7 is informed accordingly and the requesting unit sends a special message to another node having a higher level in hierarchy requesting an assignment of at least one additional address from at least one predetermined address interval allocated to a respective port of the other node.

Such a request is then received by the transceiver 2 of another node, e.g. another switch. That is, the transceiver 2 receives a request for an assignment of at least one additional address from at least one predetermined address interval allocated to a respective port from a node having a lower level in hierarchy for which it was evaluated that the predetermined address interval allocated thereto is not sufficient. This request is forwarded to the determining unit 8 which determines whether at least one non-assigned address is available in the predetermined address interval allocated to a respective port. If it is determined that at least one non-assigned address is available in the predetermined address interval allocated to a respective port, the assigning unit 4 assigns the at least one non-assigned address as the additional address for performing communication via the respective port of the node having a lower level in hierarchy for which it was evaluated that the predetermined address interval allocated thereto is not sufficient.

Such a determination can be based on reports of address space usage provided from nodes other than the node requesting assignment of the at least one additional address having a lower level in hierarchy received by the transceiver 2. The transceiver 2 further can send such a report of address space usage to a node having a higher level in hierarchy.

In the foregoing description of the switch, only the units that are relevant for understanding the principles of the exemplary embodiments of the invention have been described using functional blocks. Of course it is obvious that the switch may comprise further units that are necessary for their operation. However, a description of these units is omitted in this specification. The arrangement of the functional blocks of the switch is not construed to limit the invention, and the functions may be performed by one block or further split into sub-blocks.

In view of the foregoing description it will be evident to a person skilled in the art that various modifications may be made within the scope of the invention.

The invention claimed is:

1. A method, comprising:
   receiving, at a first port of a first node from a first port of a second node in communication with the first port of the first node, an address assignment message, the address assignment message originating from a host node in communication with a second port of the second node, and the address assignment message being indicative of one or more address intervals designated for allocation to one or more ports of the first node and the second node from an address space available for allocation to ports of networked nodes in communication with each other;
   allocating, to the first port of the first node, an address assigned to the host node from the address space to indicate that the host node is reachable by forwarding from the first node a message intended for the host node through the first port of the first node;
   allocating, to each port of the first node other than the first port of the first node, a distinct portion of an address interval available from the address space, the address interval being previously allocated to the first port of the second node; and
   forwarding, by the first node, the address assignment message through each port of the first node other than the first port of the first node.

2. The method according to claim 1, further comprising:
   determining, by the first node, that an interval allocated to as second port of the first node is not sufficient for assigning at least one individual address to each other node connected to the second port of the first node; and
   responsive to determining that the interval allocated to the second port of the first node is not sufficient, requesting, by the first node, assignment of an additional address from an interval allocated to a third port of the first node or an interval allocated to the first port of the first node.

3. The method according to claim 2, wherein the requesting assignment of the additional address from the interval allocated to the third port of the first node or the interval allocated to the first port of the first node comprises requesting assignment of the additional address from a port that is adjacent to the second port of the first node.

4. The method according to claim 2, further comprising:
   based on the requesting, determining, by the first node, that a non-assigned address is available in the interval allocated to the third port of the first node or the interval allocated to the first port of the first node; and
   responsive to determining that the non-assigned address is available, assigning, by the first node, the non-assigned address as the additional address.

5. The method of claim 4, wherein the assigning, by the first node, the non-assigned address as the additional address results in the additional address being assigned to the second port of the first node when each address of the interval allocated to the second port is also assigned to the second port of the first node.

6. The method according to claim 2, further comprising:
   based on the requesting, determining, by the first node, that a non-assigned address is not available in the interval allocated to the third port of the first node or the interval allocated to the first port of the first node; and
   responsive to determining that the non-assigned address is not available, requesting, by the first node, assignment of an address from an interval allocated to a port of a node having a higher level in hierarchy than the first node.

7. The method according to claim 6, further comprising:
   determining, by the node having the higher level in hierarchy than the first node, that the address from the interval allocated to the port of the node having the higher level in hierarchy than the first node is available based on a report of address space usage provided from one or more nodes other than the first node.

8. The method of claim 1, wherein the address space is a plurality of sequential addresses available for allocation to the ports of the networked nodes in communication with each other via a network.

9. An apparatus, comprising:
   one or more processors; and
   memory storing executable code configured to, with the one or more processors, cause the apparatus to at least:
      receive, at a first port of the apparatus from a first port of as node in communication with the first port of the apparatus, an address assignment message, the address assignment message originating from a host node in communication with a second port of the node, the address assignment message being indicative of one or more address intervals designated for allocation to one or more ports of the apparatus and the node from an address space available for allocation to ports of networked nodes in communication with each other;
      allocate, to the first port of the apparatus, an address assigned to the host node from the address space to indicate that the host node is reachable by forwarding from the apparatus a message intended for the host node through the first port of the apparatus;
      allocate, to each port of the apparatus other than the first port of the apparatus, a distinct portion of an address interval available from the address space, the address interval being previously allocated to the first port of the node; and
      forward the address assignment message through each port of the apparatus other than the first port of the apparatus.

10. The apparatus according to claim 9, wherein the executable code is configured to, with the one or more processors, cause the apparatus to:
    determine that an interval allocated to a second port of the apparatus is not sufficient for assigning at least one individual address to each other node connected to the second port of the apparatus; and
    responsive to determining that the interval allocated to the second port of the apparatus is not sufficient, request assignment of an additional address from an interval allocated to a third port of the apparatus or an interval allocated to the first port of the apparatus.

11. The apparatus according to claim 10, wherein causing the apparatus to request assignment of the additional address from the interval allocated to the third port of the apparatus or the interval allocated to the first port of the apparatus comprises causing the apparatus to request assignment of the additional address from a port that is adjacent to the second port of the apparatus.

12. The apparatus according to claim 10, wherein the executable code is configured to, with the one or more processors, cause the apparatus to:

based on the request, determine that a non-assigned address is available in the interval allocated to the third port of the apparatus or the interval allocated to the first port of the apparatus; and responsive to determining that the non-assigned address is available, assign the non-assigned address as the additional address.

13. The apparatus according to claim 10, wherein the executable code is configured to, with the one or more processors, cause the apparatus to:

based on the request, determine that a non-assigned address is not available in the interval allocated to the third port of the apparatus or the interval allocated to the first port of the apparatus; and responsive to determining that the non-assigned address is not available, request assignment of an address from an interval allocated to a port of another node having a higher level in hierarchy than the apparatus.

14. The apparatus according to claim 10, wherein the executable code is configured to, with the one or more processors, cause the apparatus to:

receive, from another node having a lower level in hierarchy than the apparatus, a request for an assignment of an address from an interval allocated to one of the ports of the apparatus.

15. The apparatus according to claim 14, wherein the executable code is configured to, with the one or more processors, cause the apparatus to:

determine that the address from the interval allocated to one of the ports of the apparatus is available based on a report of address space usage provided from one or more nodes other than the another node having the lower level in hierarchy than the apparatus.

16. A system, comprising:
a first node; and
a second node that comprises a transceiver;
wherein the first node is configured to send, through a first port of the first node in communication with a first port of the second node, an address assignment message, the address assignment message originating from a host node in communication with a second port of the first node, and the address assignment message being indicative of one or more address intervals designated for allocation to one or more ports of the first node and the second node from an address space available for allocation to ports of networked nodes in communication with each other;
wherein the second node is configured to:
receive, via the transceiver, the address assignment message at the first port of the second node from the first port of the first node,
allocate, to the first port of the second node, an address assigned to the host node from the address space to indicate that the host node is reachable by forwarding from the second node a message intended for the host node through the first port of the second node;
allocate, to each port of the second node other than the first port of the second node, a distinct portion of an address interval available from the address space, the address interval being previously allocated to the first port of the first node; and
forward the address assignment message through each port of the second node other than the first port of the second node.

17. The system according to claim 16, wherein the first node is a switch that is connected to the host node and the second node is a switch connected to the first node.

18. The system according to claim 16, wherein the system further comprises a system area network, wherein the first node and the second node are each a part of the system area network, and wherein the address space represents an available address space for communicating over the system area network.

19. A non-transitory computer-readable medium storing executable code that, when executed, causes an apparatus to at least:

receive, at a first port of the apparatus from a first port of a node in communication with the first port of the apparatus, an address assignment message, the address assignment message originating from a host node in communication with a second port of the node, and the address assignment message being indicative of one or more address intervals designated for allocation to one or more ports of the apparatus and the node from an address space available for allocation to ports of networked nodes in communication with each other;

allocate, to the first port of the apparatus, an address assigned to the host node from the address space to indicate the host node is reachable by forwarding from the apparatus a message intended for the host node through the first port of the apparatus;

allocate, to each port of the apparatus other than the first port of the apparatus, a portion of an address interval available from the address space, the address interval being previously allocated to the first port of the node; and forward the address assignment message through each port of the apparatus other than the first port of the apparatus.

20. The non-transitory computer-readable medium according to claim 19, wherein the executable code, when executed, causes the apparatus to:

determine that an interval allocated to a second port of the apparatus is not sufficient for assigning at least one individual address to each node connected to the second port of the apparatus, and responsive to determining that the interval allocated to the second port of the apparatus is not sufficient, request assignment of an additional address from an interval allocated to a third port of the apparatus or an interval allocated to the first port of the apparatus.

21. The non-transitory computer-readable medium according to claim 20, wherein causing the apparatus to request assignment of the additional address from the interval allocated to the third port of the apparatus or the interval allocated to the first port of the apparatus comprises causing the apparatus to request assignment of the additional address from a port that is adjacent to the second port of the apparatus.

22. A first node comprising:
a transceiver and circuitry, wherein the circuitry of the first node is configured to:
receive, via the transceiver at a first port of the first node from a first port of a second node in communication with the first port of the first node, an address assignment message, the address assignment message originating from a host node in communication with a second port of the second node, and the address assignment message behind indicative of one or more address intervals designated for allocation to one or more ports of the first node and the second node from an address space available for allocation to ports of networked nodes in communication with each other;

allocate, to the first port of the first node, an address assigned to the host node from the address space to indicate that the host node is reachable by forwarding from the first node a message intended for the host node through the first port of the first node;

allocate, to each port of the first node other than the first port of the first node, a distinct portion of an address interval available from the address space, the address interval being previously allocated to the first port of the second node; and forward the address assignment message through each port of the first node other than the first port of the first node.

\* \* \* \* \*

UNITED STATES PATENT AND TRADEMARK OFFICE
CERTIFICATE OF CORRECTION

PATENT NO.         : 9,571,448 B2
APPLICATION NO.    : 12/332285
DATED              : February 14, 2017
INVENTOR(S)        : Sergey Balandin et al.

It is certified that error appears in the above-identified patent and that said Letters Patent is hereby corrected as shown below:

In the Claims

Column 11, Claim 2, Line 34:
Please delete "as second port" and replace with --a second port--

Column 12, Claim 9, Line 23:
Please delete "of as node" and replace with --of a node--

Column 14, Claim 22, Line 63:
Please delete "message behind indicative" and replace with --message being indicative--

Signed and Sealed this
Sixth Day of June, 2017

Michelle K. Lee
*Director of the United States Patent and Trademark Office*